Feb. 23, 1960   G. E. GARD   2,926,232
EDGE HEATERS FOR THERMOPLASTIC DIELECTRIC WORKPIECES
Filed Sept. 2, 1958   2 Sheets-Sheet 1
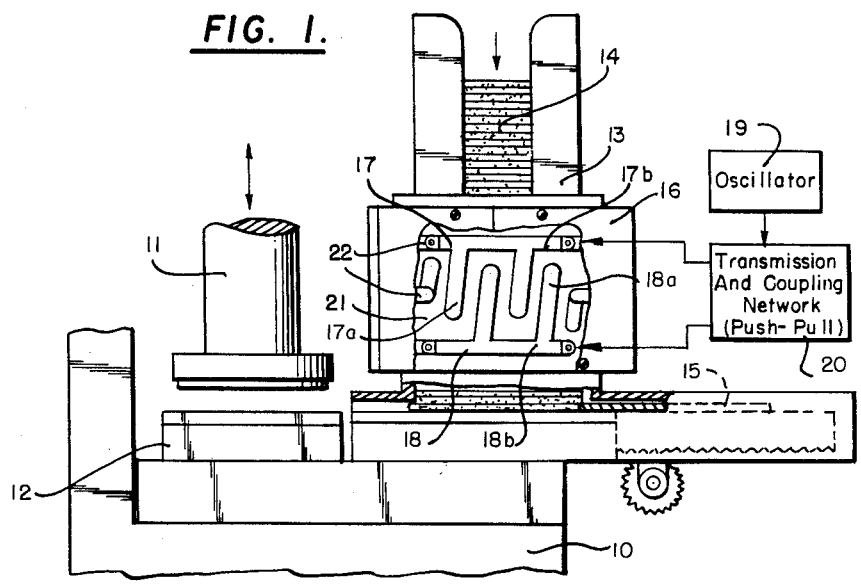
FIG. 1.
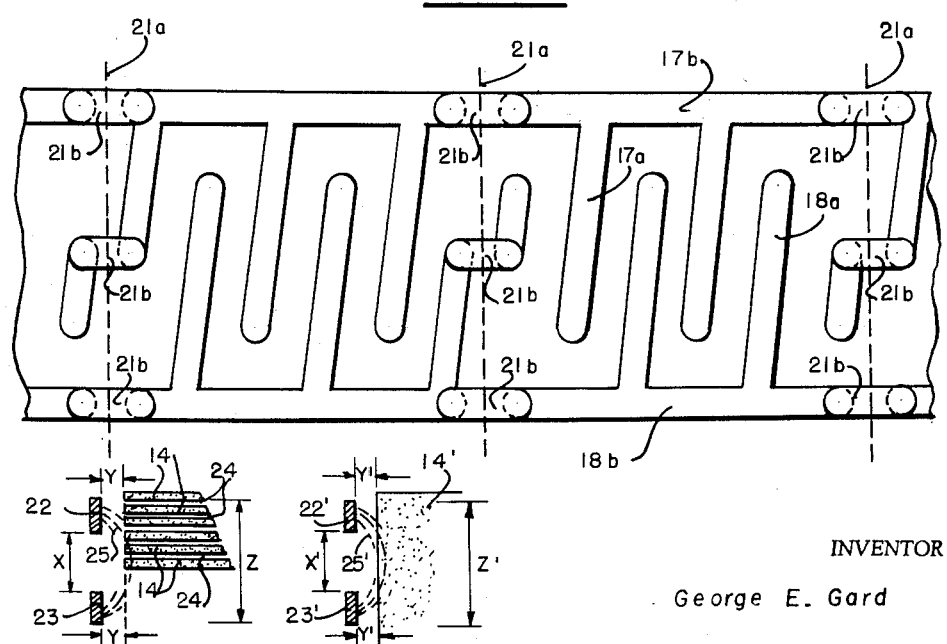
FIG. 2.
FIG. 3A.   FIG. 3B.
INVENTOR
George E. Gard
BY
ATTORNEY Feb. 23, 1960  G. E. GARD  2,926,232
EDGE HEATERS FOR THERMOPLASTIC DIELECTRIC WORKPIECES
Filed Sept. 2, 1958  2 Sheets-Sheet 2

INVENTOR
George E. Gard
BY
ATTORNEY

United States Patent Office 2,926,232
Patented Feb. 23, 1960

2,926,232

EDGE HEATERS FOR THERMOPLASTIC DIELECTRIC WORKPIECES

George E. Gard, East Hempfield Township, Lancaster County, Pa., assignor to Armstrong Cork Company, Lancaster, Pa., a corporation of Pennsylvania Application September 2, 1958, Serial No. 758,525

12 Claims. (Cl. 219—10.43)

The present invention relates to dielectric heater structures and is more particularly concerned with improved arrangements adapted to preferentially heat limited portions of a thermoplastic dielectric workpiece to be cut, whereby said limited portions may be readily cut without otherwise affecting the dimensions of said workpiece.

In a prior copending application to Werner Rueggeberg, Serial No. 716,303, filed February 20, 1958, and entitled "Method and Apparatus for Edge Heating Thermoplastic Dielectrics," which prior application is as-signed to the assignee of the instant application, various structures and considerations have been described related to the heating and trimming of thermoplastic dielectric workpieces such as linoleum composition tiles. This prior application is incorporated herein by reference for a more complete discussion of the problems recognized and solutions contemplated thereby, inasmuch as these problems and solutions find general pertinence to the subject matter in the instant application. In order to appreciate the problems and solutions, however, the following brief discussion will now be given.

As is well known, it is often desired to cut or trim various dielectric workpieces in order to secure certain final dimensions for such workpieces; and such cutting operations in many cases comprise die punching processes. In the particular case of rigid sheet materials of dielectric construction, e.g. linoleum tiles, it is quite normal to rough-cut the tiles to approximately desired dimensions whereafter said rough-cut tiles are finally trimmed within fairly precise tolerances to desired final dimensions. In the case of linoleum tiles of the types employed as flooring materials, it is, for example, normally desired to make a final trim to a tolerance of within 0.005 inch.

As a practical matter, it has been found fairly difficult to effect trims of these tolerances when the material being cut is relatively rigid. It has been suggested therefore that the materials, prior to the cutting operation, should be heated somewhat; but it has been found that when the entire tile or workpiece is heated to render it more pliable for an edge trimming operation, the dimensional stability of said workpiece is adversely affected, wherefore the tile, by expanding and contracting as a result of said generalized heating and subsequent cooling, assumes a final dimension which is appreciably different from that actually sought during the trimming operation.

In an effort to obviate this difficulty arising from generalized heating, the aforementioned prior copending application of Werner Rueggeberg has suggested an improved form of apparatus comprising a hopper, having dielectric heater means in the walls thereof, adapted to receive and feed a stack of dielectric workpieces to a die cutting apparatus. As the said workpieces are fed through the hopper, the aforementioned heater means, which may comprise an energized electrode arrangement in the walls of the hopper itself, produces a stray high frequency heating field which couples a limited peripheral area of said tiles, whereby said peripheral areas are preferentially heated to a temperature in the order of 100° to 120° F. The edge heated tiles are sequentially fed from the bottom of said hopper to a die cutting apparatus whereby the heated edges are trimmed prior to any appreciable cooling thereof; and this heating and trimming process, being confined to limited edge areas of the tiles and being effected by a relatively cold cutting tool, assures that extremely accurate cuts can be effected at rapid rates.

The particular form of apparatus suggested in the prior copending Rueggeberg application, identified previously, is characterized by a dielectric heater construction comprising a plurality of dielectric hopper walls physically supporting a plurality of elongated electrically interconnected electrode bars. These bars are in turn disposed in substantially horizontal directions, i.e. in directions which are substantially colinear with the edges of the tiles being heated, whereby the stray high frequency heating field mentioned previously is produced between said horizontal electrodes and couples the tile edges in directions generally transverse to the planes of said tiles. In addition, said electrode arrangement of the prior Rueggeberg application comprises a plurality of electrodes some of which are energized from a single-ended high frequency source and others of which are grounded, whereby the aforementioned high frequency field occurs between said electrically energized and electrically grounded electrodes.

While the arrangements thus described have been found to work efficiently, certain disadvantages thereof have become apparent under actual operating conditions. First, it has been found that the use of dielectric supporting structures forming the hopper walls and carrying the aforementioned bar electrodes therein, renders maintenance of the overall arrangement difficult under certain circumstances. In particular, it has been found that, as the apparatus is operated for an extended period of time, dirt and other foreign matter tends to accumulate adjacent the hopper walls and arcing has occurred between said electrodes and the accumulation of foreign matter. In order to eliminate this arcing, it is therefore necessary to remove said foreign matter; and as a practical matter it has been found that, due to the construction of the prior system described previously, this cleaning operation has necessitated that the dielectric supporting structures and their associated electrodes be disassembled. While the Rueggeberg structure does provide for such ready disassembly of the overall hopper, it has nevertheless been relatively time consuming to accomplish this disassembly and cleaning.

The present invention, recognizing this difficulty, accordingly teaches in one embodiment thereof an improved electrode disposition and supporting arrangement wherein the electrodes are completely open to air rather than being partially covered by dielectric sheet material, whereby cleaning operations can be readily effected by simply blowing air past the exposed electrodes periodicaly should foreign matter accumulate.

In addition, it was found that the use of some energized and some grounded electrodes necessitated the use of a single-ended oscillatory source for energizing said electrodes; and as a result, the voltages between the energized electrodes and ground were relatively high thereby increasing the possibility of arcing. The present invention eliminates this further difficulty by changing the electrode system from a single-ended to a push-pull arrangement thereby reducing the voltage to ground to about one-half the voltage to ground in an equivalent single-ended system, while still maintaining the same power input. This reduction in voltage simultaneously accomplishes a considerable reduction in the possibility of arcing. As a practical matter, the push-pull arrangement employed preferably comprises a coupling network, and incorporates coupling and impedance considerations, of the type discussed in the prior copending application of George E. Gard and Werner Rueggeberg, Serial No. 666,684, filed June 19, 1957, for: "Dielectric Heater Electrode Systems." These latter arrangements can be termed "virtual push-pull" arrangements; and it must be understood that the term "push-pull" employed hereinafter and in the appended claims is meant to encompass such virtual push-pull arrangements.

Finally, in the prior systems discussed previously, the electrodes were, as mentioned, disposed in directions generally colinear with the edges of the tiles, wherefore the stray field produced between adjacent ones of said electrodes passes through not only the tile edges but also through the air gaps existing between the stacked tiles. This coupling of energy to both the tiles and intermediate air gaps is relatively inefficient since electrical stress is dissipated in the air gaps rather than being efficiently utilized in heating the tile edges. Moreover, by reason of the prior arrangement of electrodes, which will be termed "horizontal" electrode arrangements hereinafter, it has been found that the load on the oscillator energizing said electrodes tends to vary as the tiles are fed through the hopper, due to the fact that the air gaps between said tiles tend to vary in size during the feeding operation. This variation in load has been accompanied by power variation in the oscillator output, as well as by reduced oscillator stability and reduced power factor, all of which are relatively undesirable.

The present invention serves to obviate these difficulties by utilizing an improved electrode arrangement of the so-called "vertical" electrode type, wherein the electrodes are disposed in directions transverse to the planes of the tiles being heated; and by use of such vertical electrode arrangements all of the aforementioned electrical disadvantages, which are characteristic of horizontal electrode arrangements, are avoided.

It is accordingly an object of the present invention to provide an improved arrangement adapted to edge heat thermoplastic dielectric materials such as linoleum composition tile or sheet material.

A further object of the present invention resides in the provision of an apparatus adapted to preferentially heat the edges of thermoplastic sheet material with greater efficiency than has been possible heretofore.

A still further object of the present invention resides in the provision of an improved die cutting apparatus including heater means of novel construction adapted to edge heat thermoplastic dielectric materials while simultaneously effecting increased power factor, increased oscillator stability and reduced power variation of the oscillator utilized to energize the electrodes of said dielectric heater.

Still another object of the present invention resides in the provision of an improved hopper arrangement adapted for use in preferentially heating the edges of thermoplastic dielectric materials and so arranged that the heater portion thereof may be more readily cleaned than has been possible heretofore, whereby maintenance cost and time is appreciably reduced.

Still another object of the present invention resides in the provision of a hopper arrangement adapted to receive thermoplastic dielectric workpieces for edge heating thereof and comprising an electrode system which is supported and energized in a novel manner thereby to reduce the possibility of arcing in the overall system.

A still further object of the present invention resides in the provision of a hopper arrangement adapted to receive thermoplastic dielectric workpieces to be edge heated, and comprising an electrode arrangement so disposed with respect to said workpieces that the field produced between said electrodes tends to couple the workpieces in directions substantially coplanar with said workpieces thereby increasing the efficiency of the overall system.

The foregoing objects, advantages, construction and operation of the present invention will become more readily apparent from the following description and accompanying drawings, in which:

Figure 1 is an illustrative diagram of a heating and trimming apparatus constructed in accordance with one embodiment of the present invention.

Figure 2 illustrates one electrode disposition such as may be employed in the arrangement of Figure 1.

Figures 3A and 3B respectively represent the fields produced by "horizontal" and "vertical" electrode systems, for purposes of comparison.

Figure 4:
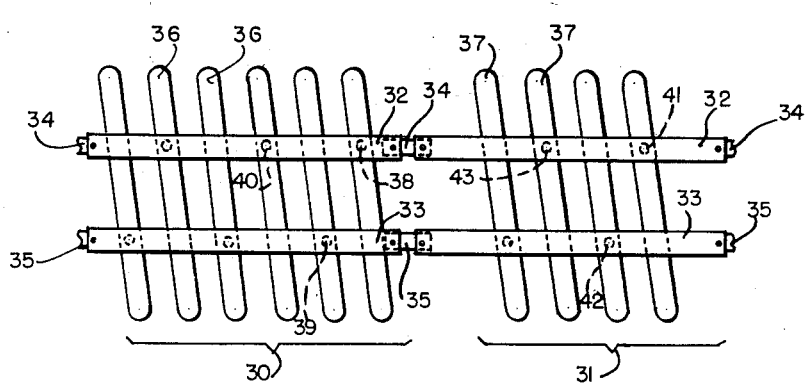

Figure 4 illustrates an alternative form of electrode arrangement such as may be employed in the present invention.

Figure 5:
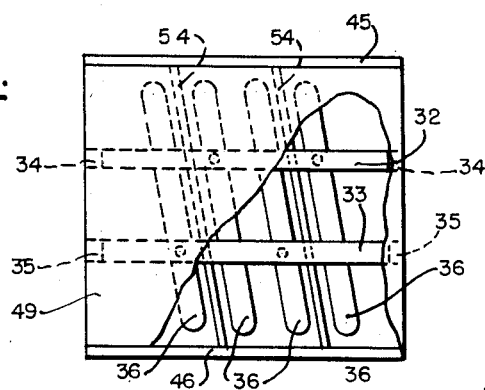

Figure 5 is a side view, in partial section, illustrating a portion of a hopper embodying the electrodes of Figure 4.

Figure 6:
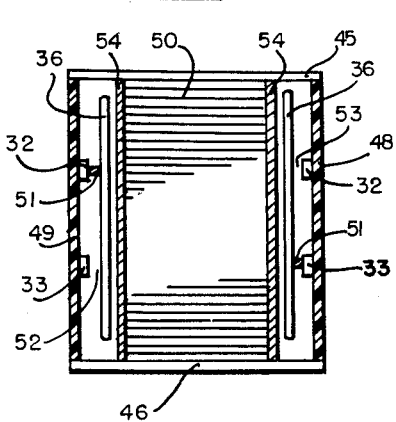
Figure 7:
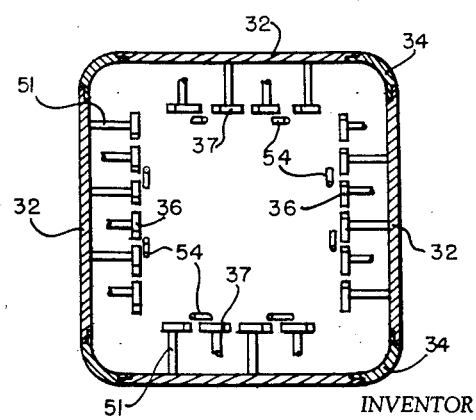

Figure 6 is an illustrative front view, in partial section, of a hopper such as is shown in Figure 5; and Figure 7 is an illustrative top view of a portion of the arrangements shown in Figures 5 and 6.

Referring now to Figure 1, it will be seen that an improved heating and trimming apparatus constructed in accordance with the present invention may comprise a press 10 having a cutting die 11 adapted to reciprocate toward a cutting platen 12. Press 10 further includes a hopper 13 of open topped substantially rectangular configuration adapted to receive a stacked plurality of dielectric workpieces 14 which may, for example, be linoleum composition tiles. The said workpieces 14 are adapted to be fed in sequence from the bottom of hopper 13 by a feeding plate 15 which is mounted for reciprocatory motion in synchronism with the reciprocal motions of cutting die 11, whereby successive ones of said workpieces 14 are fed from hopper 13 onto cutting platen 12 for edge trimming thereof.

A heater arrangement 16 is disposed adjacent the lower portion of hopper 13 whereby, in operation, the stacked tiles 14 are caused to move, during operation of feeding plate 15, past a dielectric heating field produced by heater portion 16; and the heater portion 16 is in turn preferably so constructed and arranged that it produces a high frequency heating field closely confined to the inner walls of the hopper and operative to preferentially heat the edges of tiles 14 to a temperature of approximately 100° to 120° F. and to a peripheral depth of approximately ¼ inch. These preferentially heated tiles are thereafter fed in sequence from the bottom of hopper 13 to the cutting apparatus illustrated, whereby the edges which have been softened during the heating operation, are rapidly and accurately cut by the relatively cold cutting die, with the result that extremely accurate cuts can be effected without affecting the dimensional stability of the several tiles.

The particular general arrangement thus shown in Figure 1 and described above, is set forth in some detail in the prior Rueggeberg application, identified previously. The particular form of electrode system comprising the dielectric heater of said prior Rueggeberg application comprises, as mentioned previously, a plurality of generally horizontal electrodes which are electrically interconnected to one another to provide a plurality of ring-like electrodes completely encircling the hopper 13; and alternate ones of these electrodes are energized from a single-ended oscillator system while intermediate ones of said electrodes are grounded to produce the stray field desired in preferentially edge heating the tiles 14.

In accordance with the improvement of the present invention, this horizontal electrode arrangement is replaced by a vertical electrode arrangement which exhibits a number of advantages, mentioned previously and to be discussed more fully hereinafter. The vertical electrode arrangement shown in Figure 1 comprises a pair of unitary electrodes 17 and 18, each of which is of comb-like configuration. The "teeth" of said comb-like electrodes are interleaved with one another, as shown in Figure 1, with said teeth being disposed in generally vertical directions transverse to the planes of the several tiles 14. These vertically disposed electrodes have been designated in Figure 1 as 17a and 18a respectively.

The electrodes 17 and 18, in addition, include horizontal portions 17b and 18b respectively, which act as feeders; and these feeder portions are coupled to an oscillator 19 via transmission and push-pull coupling network 20 whereby the electrodes 17 and 18 are energized in push-pull. While a generalized push-pull system is shown in Figure 1, it should be noted that the electrodes may in fact be fed from a single-ended source, and the stray capacities between said electrodes and ground may be used as ground return paths, thereby to effect a virtual push-pull system as described in prior copending application Serial No. 666,684, identified previously. It will be appreciated that by reason of the actual or virtual push-pull arrangement employed, a virtual ground is caused to occur between adjacent interleaved electrodes 17a and 18a, with the result that the voltage between each electrode and ground is reduced to approximately one-half of that in an equivalent single-ended system. This reduction in voltage, which is accomplished without reducing the power in the heater itself, appreciably reduces the possibility of arcing.

The electrodes 17 and 18 shown in Figure 1 are mounted in a dielectric supporting structure 21 which may comprise a liner of insulating material such as Teflon, silicone, or a Teflon-Teflon-glass laminate; and the supporting structure 21 actually comprises a typical one of four similar such structures comprising the supporting sides of the heater 16 formed in the lower portion of hopper 13. In practice, the several electrodes 17 and 18, formed in each such insulating support 21, are interconnected to one another adjacent the edges 21a of said supports 21, for example by coupling links generally designated 21b in Figure 2, whereby a continuous electrode arrangement of the type shown in Figure 2 may be formed in encircling relation to the stack of workpieces 14. In addition, the several sides of the electrode system shown in Figure 2 are energized in push-pull in accordance with the discussion already given in reference to Figure 1 whereby such push-pull energization produces a stray field on all sides of the hopper adapted to couple and preferentially heat all the peripheral edges of the several tiles 14.

In order that the advantages achieved by the vertical electrode arrangement of Figure 1 may be more readily appreciated, reference is now made to Figures 3A and 3B. Figure 3A illustrates certain considerations which arise when horizontal electrodes of the type contemplated by the prior Rueggeberg application are employed; and it will be appreciated that the actual representation of Figure 3A comprises a side view showing the edges of plural tiles 14 as well as an end view of elongated horizontally disposed electrodes 22 and 23. In such an arrangement the several tiles 14 are separated by air gaps 24; and the field 25 produced between electrodes 22 and 23, inasmuch as it passes through the tiles 14 in directions generally transverse to their planes, couples not only to the edges of tiles 14 but also to the intermediate air gaps 24.

As a practical matter, a voltage X exists between the electrodes 22 and 23, while a voltage Y exists between each of electrodes 22, 23 and their associated stack of tiles 14. If we should assume, for purposes of illustration, that the voltage X is in the order of 3000 volts, and that each of voltages Y are in the order of 1000 volts, it will be seen that (for purposes of illustration only) a voltage Z in the order of 1000 volts will exist across a series impedance comprising tiles 14 and their intermediate air gaps 24. As a result, therefore, the voltage Z is dissipated not only in the tiles 14 but also in the several air gaps 24, whereby the actual voltage useful in heating the tiles is reduced below the theoretical value of 1000 volts. By reason of this voltage loss in the air gaps 24, therefore, the resultant efficiency of the system is considerably reduced.

Moreover, it should be noted that the air gaps 24 are not constant in size and, as tiles are fed into and out of the stack, some fluctuation in the air gap dimensions may occur. This fluctuation in turn results in varying amounts of voltage being lost in the air gaps and also results in a varying load on the oscillator energizing electrodes 22 and 23 whereby power variation of the oscillator is increased and oscillator stability is decreased. From an electrical point of view, the horizontal electrode arrangement of Figure 3A is such that the capacities between the tiles (due to the air gaps 24) occur in series with the capacities between the electrodes 22, 23 and the tiles 14, with the result that air gap variations effect appreciable variations in the total capacity presented to the oscillator.

These various disadvantages of the system shown in Figure 3A are obviated by the arrangement of Figure 3B which is characteristic of the present invention. It will be appreciated that the arrangement of Figure 3B, since it employs vertical electrodes, is taken on a view which is 90° to the view of Figure 3A, and actually comprises a top view of a single tile 14' as well as a top view of a pair of elongated substantially vertically disposed electrodes 22' and 23'. As was the case in the arrangement of Figure 3A, a voltage X' may exist between the electrodes 22' and 23' while further voltages Y' may exist between each of the electrodes 22', 23' and the tile 14'. Due to the change in relative orientation between the electrodes and tile, however, the stray field 25' now passes through the tile 14' in directions which are generally coplanar with said tile 14' whereby air gaps existing between the tiles no longer have significant effect upon the system.

In particular, if we should assume the voltage quantities discussed previously, the voltages X' and Y' may be in the order of 3000 and 1000 volts respectively, while the voltage Z' may again be in the order of 1000 volts; but it will be noted that this voltage Z' now appears across a tile only rather than across a series connection of tiles and intermediate air gaps. As a result, the voltage across a given tile is not reduced due to voltage losses in air gaps between tiles whereby each tile in the stack is heated more efficiently than is possible in the arrangement of Figure 3A. Moreover, it will be noted that insofar as the electrical equivalent of Figure 3B is concerned, the capacities between the tiles appear in shunt with (rather than in series with) the capacities between the electrodes 22', 23' and tile 14'; and any variation in this shunt capacity is far less significant in total load variation than was the case in a variation of series capacity such as might occur in the arrangement of Figure 3A. The arrangement of Figure 3B, which utilizes vertical electrodes characteristic of the present invention, therefore, results in an increased power factor, increased oscillator stability, and reduced power variation of the oscillator, all of which are highly desirable in systems such as are contemplated herein.

The particular arrangement of electrodes described in reference to Figures 1 and 2, while termed vertical electrodes, are actually such that the electrode portions 17a and 18a are inclined slightly to the vertical, i.e. are inclined slightly to the direction of travel of the workpieces 14 through the hopper 13. It has been found in practice that one preferred inclination for the electrode portions 17a and 18a is in the order of 10°, and preferably 8° to the vertical; and this slightly inclined disposition of electrodes is preferred in order to avoid so-called "scalloped" edge heating.

In particular, referring to Figure 3B, it will be seen that the field 25' is generally arcuate in shape, whereby maximum heating of the tile edge tends to occur at a point intermediate the electrodes 22' and 23', with decreased heating effects occurring in portions of the tile approaching positions directly opposite the electrodes. If the electrodes 22' and 23' (or 17a and 18a) are perfectly vertical, the several tiles 14 will, as they pass through this scalloped field, tend to be heated in a similarly scalloped manner, i.e. the actual heat gradients of the tile edges would show a cyclic rise and fall at positions intermediate and opposite the several electrodes. The use of electrodes which are slightly inclined to the direction of travel of the workpieces through the hopper obviates this undesirable variant heating by causing the effective field to shift along the edges of the several tiles 14 as those tiles are moved past the electrodes. As a result, a tile 14 will tend to be uniformly heated along its edge after it passes completely through the heater 16.

The particular electrode arrangements shown in Figures 1 and 2 comprise, as already discussed, unitary electrodes including a substantially horizontal feeder and substantially vertical electrode portions integrally formed therewith. In addition, the arrangements described utilize an insulating hopper liner for supporting the several electrodes in position adjacent all sides of the tile stack. As a practical matter, it may often be desired to form the feeders and electrodes as separate units which are interconnected to one another thereafter; and it will further be appreciated, in light of the discussion already given, that it is preferable to eliminate the insulating liner insofar as possible to facilitate cleaning and removal of foreign matter accumulating in the hopper. An alternative arrangement constructed in light of these latter considerations is shown in Figures 4 through 6.

Referring now to Figure 4, it will be seen that two adjacent sides of a hopper may utilize, respectively, electrode sets designated generally 30 and 31; and it will be understood that the other two sides of the hopper (comprising a total of four sides) may be similarly formed. Each hopper side includes a pair of feeders 32 and 33, and the complementary feeders in the several hopper sides are interconnected by coupling links 34 and 35 at the corners of the hopper, thereby to form a pair of feeders continuously encircling the stack of tiles 14. A plurality of electrode bars 36 may be disposed adjacent one side of the hopper while a further plurality of electrode bars 37 may be disposed on an adjacent side of the hopper; and each of these electrodes is slightly inclined to the vertical, i.e. with an 8° inclination, to prevent scalloped heating as has already been discussed.

The several electrodes 36 are electrically connected in alternation to the pair of feeders 32 and 33, as at 38, 39, 40, etc., and similarly the plurality of electrodes 37 are alternately connected to their associated pair of feeders 32 and 33, as at 41, 42, 43, etc. In practice, and in order to form an appropriately limited field adapted to penetrate and couple to the edges of the tile to a depth of only about one-fourth inch, the several electrodes 36 may be spaced from one another by approximately 1.73 inches and may have a total vertical height in the order of nine inches; while the feeders 32 and 33 may be spaced from one another on the order of three and one-half inches on centers. The several feeders and electrodes may comprise 3/16 inch copper with the feeders having a width of substantially 3/4 inch each, while the electrodes have a width of substantially 5/8 inch. The feeders may be energized at a frequency of approximately 27.2 mc. These dimensions and frequencies have been found to give a field proper to effect the desired preferential edge heating of linoleum composition tiles.

In order to permit more ready cleaning of the hopper, thereby to remove the possibility of arcing, it is desired to so mount the several electrodes 36 and 37 that they are exposed to air whereby a blast of compressed air can be employed for cleaning, thus eliminating the necessity of hopper disassembly. It will be appreciated, however, that the elimination of an insulating liner, such as has been discussed in reference to Figure 1 as well as in the prior Rueggeberg application, requires that some auxiliary tile guide means be provided adjacent the electrodes 36 and 37 to prevent the tiles from coming into direct physical contact with the electrodes themselves. This guiding function is accomplished, as will become apparent hereinafter, by disposing a pair of spaced tile guides at positions inside the planes of electrodes 36 and 37; and at locations intermediate pairs of adjacent electrodes in the virtual ground plane existing therebetween. These tile guides being located in the theoretical ground planes between adjacent electrodes, do not interfere with the electric field existing between electrodes, and do not heat excessively; and the provision of such guides permits the elimination of an insulating liner of the type discussed previously.

This arrangement is shown with greater particularity in Figures 5, 6 and 7. The hopper, constructed in accordance with this alternative arrangement, comprises a pair of substantially rectangular frames 45 and 46 which may be constructed of steel, disposed adjacent the top and bottom of the hopper heating portion. Dielectric insulating sheets such as 48 and 49 may be disposed between the corresponding sides of frames 45 and 46, it being understood that such a sheet appears on all four sides of the frames to enclose the hopper heating portion. The feeders 32 and 33 are in turn supported by sheets such as 48 and 49 at positions which are between said sheets and the stack of workpieces 50. These feeders are connected in alternate relation to the several inclined electrodes 36 by copper slugs 51 brazed between the feeders and their associated electrodes; and it will be noted that the copper slugs 51 are of sufficient dimension to provide air spaces such as 52 and 53 between the electrodes 36 (or 37) and the feeders passing adjacent thereto but unconnected thereto. The actual representation of slugs 51 (Figure 6) is illustrative only; and similar such slugs adjacent the positions 52 and 53 and existing between the feeders and electrodes coplanar with the actual electrodes 36 illustrated, have not been depicted in Figure 6, and have been only partially depicted in Figure 7, for purposes of clarity.

A pair of tile guides 54 are disposed in the theoretical ground plane existing between adjacent pairs of electrodes 36; and these tile guides 54, as is more clearly illustrated in Figures 6 and 7, project inside the plane of the several electrodes 36 and are supported between the frames 45 and 46 whereby they tend to maintain the tiles 50 in stacked array but out of physical contact with the electrodes 36. It will be appreciated that a pair of tile guides such as 54 are disposed on each of the four sides of the hopper to form a substantially rectangular guide adapted to confine the several tiles in stack 50.

By reason of the arrangement thus described, it will be noted that all of the electrodes 36 are exposed to air on both sides thereof. As a result, if foreign matter should accumulate in the hopper, the stack of tiles 50 need merely be removed, and this foreign matter can then readily be blown out of the hopper by a stream of compressed air or the like. This represents a significant improvement in regard to the cost and time of maintenance of the overall arrangement.

While I have thus described preferred embodiments of the present invention, many variations will be suggested to those skilled in the art. It must therefore be emphasized that the foregoing discussion is meant to be illustrative only and should not be considered limitative of my invention; and all such variations and modifications as are in accord with the principles described, are meant to fall within the scope of the appended claims.

Having thus described my invention, I claim:

1. In combination, an elongated upright substantially rectangular hopper adapted to receive a stack of flat thermoplastic dielectric workpieces with the plane of each said workpiece being transverse to the direction of elongation of said hopper, said hopper including means producing a high frequency heating field closely confined to the inner walls of said hopper, said last-named means including a plurality of elongated bar electrodes extending in spaced substantially parallel relation to one another in directions generally parallel to the direction of elongation of said hopper and transverse to the planes of said workpieces, means for energizing said electrodes to produce said heating field extending between said electrodes in directions substantially coplanar with said workpieces, and means disposed adjacent the bottom of said hopper for feeding said workpieces out of said hopper whereby each of said workpieces is moved progressively through said hopper and through said substantially coplanar heating field thereby to effect preferential edge heating of said workpieces.

2. The combination of claim 1 wherein said electrodes extend past the edges of each said workpiece at an angle approaching but departing from 90° to the plane of said workpiece.

3. The combination of claim 1 wherein said energizing means comprises means energizing alternate pairs of said electrodes in push-pull.

4. The combination of claim 3 wherein said hopper includes workpiece guide means disposed substantially at the virtual ground existing between selected adjacent ones of said push-pull energized electrode pairs.

5. In combination, an elongated substantially hollow rectangular hopper adapted to receive a stack of substantially flat thermoplastic dielectric workpieces with the planes of said workpieces extending parallel to one another within and across the substantially rectangular interior of said hopper, and means for preferentially heating all the edges of said stacked workpieces comprising a plurality of elongated electrodes energized by high frequency energy and supported adjacent all four sides of said substantially rectangular hopper, said electrodes extending in directions generally parallel to one another and transverse to the planes of said workpieces on all sides of said workpieces whereby said energized electrodes produce a high frequency heating field extending therebetween in directions substantially coplanar with said workpieces, said heating field being restricted in area to effect preferential heating of all the peripheral edges only of said workpieces.

6. The combination of claim 5 wherein each side of said hopper includes a supporting sheet of insulating dielectric material, conductive feeder means encircling said stack and supported by said supporting sheets at a position between each said supporting sheet and the adjacent edges of said workpieces, said electrodes being electrically connected to said feeder means and being disposed between said supporting sheets and said workpieces, said electrodes being spaced from both said supporting sheets and said workpieces by an air dielectric.

7. The combination of claim 6 wherein said hopper includes workpiece guide means disposed at limited locations within said hopper inwards of said electrodes between said electrodes and said workpieces, whereby said guide means operates to space all edges of said workpieces from all of said electrodes.

8. In combination, a hopper adapted to receive a stack of flat dielectric workpieces therein, the sides of said hopper including a plurality of conductive feeders continuously encircling said workpieces, a plurality of elongated electrodes connected to said feeders adjacent each side of said hopper, said electrodes extending in directions substantially transverse to the planes of said workpieces, means for energizing said feeders and electrodes thereby to effect a high frequency heating field closely confined to the sides of said hopper adapted to effect preferential edge heating of said workpieces, means for cutting the preferentially heated edges of said workpieces, and means for rapidly feeding said workpieces from said hopper to said cutting means prior to appreciable cooling of said workpiece edges.

9. In combination, an open-topped upright hopper adapted to receive a plurality of dielectric workpieces therein, the sides of said hopper extending substantially vertically and including a plurality of elongated bar electrodes extending in spaced substantially parallel relation to one another in substantially vertical directions, means for energizing said electrodes to produce a high frequency heating field extending between said electrodes in substantially horizontal directions, and feeding means for feeding said workpieces in a substantially vertical direction through said hopper and horizontally extending heating field, said substantially vertical electrodes being angularly disposed to the direction of movement of said workpieces through said hopper at an angle in the order of 10° to said direction of movement, whereby the field between adjacent ones of said electrodes shifts in position relative to each said workpiece during movement of said workpiece through said hopper.

10. In an apparatus adapted to effect preferential edge heating of substantially flat dielectric thermoplastic workpieces preparatory to trimming said preferentially heated edges, the improvement which comprises a hopper adapted to receive a stack of said workpieces with the planes of said workpieces being substantially parallel to one another, dielectric heater means in the walls of said hopper for producing a high frequency heating field coupling restricted peripheral edge areas only of each of said workpieces, said dielectric heater means comprising a plurality of elongated electrodes disposed in parallel relation to one another adjacent each side of said stack, alternate pairs of said elongated electrodes being energized in push-pull thereby to produce virtual grounds between adjacent pairs of said electrodes on all sides of said stack, and a plurality of elongated workpiece guides extending parallel to said electrodes and disposed at limited positions within said hopper inward of said electrodes between said elongated electrodes and the sides of said stack, each of said elongated guides extending substantially along one of said virtual grounds.

11. In an apparatus adapted to effect preferential edge heating of substantially flat dielectric thermoplastic workpieces preparatory to trimming said preferentially heated edges, the improvement which comprises a hopper adapted to receive a stack of said workpieces with the planes of said workpieces being substantially parallel to one another, means for moving said workpieces through said hopper in a direction transverse to the planes of said workpieces, and means for heating the edges of said workpieces during movement thereof through said hopper comprising a plurality of elongated energized electrodes disposed adjacent the walls of said hopper and extending transverse to the planes of said workpieces at an angle in the order of 8° to 10° to the direction of movement of said workpieces through said hopper.

12. In combination, an open-ended hollow rectangular hopper adapted to receive a plurality of dielectric thermoplastic workpieces therein, each of the four sides of said rectangular hopper including a plurality of elongated bar electrodes extending in spaced substantially parallel relation to one another, means for energizing said electrodes to produce a high frequency heating field extending between said electrodes and closely confined to the interior sides of said hopper, and feeding means for feeding said workpieces through said hopper and heating field whereby said confined heating field is operative to soften all of the peripheral edges only of each said workpiece, said electrodes extending generally in the same direction as the direction of movement of said workpieces but being angularly disposed to said direction of movement of said workpieces through said hopper whereby the field between adjacent ones of said electrodes shifts in position relative to each said workpiece during movement of said workpiece through said hopper thereby to effect uniform heating and softening of said workpiece edges during movement of said workpieces between the open ends of said hopper.

References Cited in the file of this patent
UNITED STATES PATENTS

| | | |
|---|---|---|
| 2,440,316 | Unterweiser | Apr. 27, 1948 |
| 2,506,158 | Mann et al. | May 2, 1950 |
| 2,631,642 | Richardson et al. | Mar. 17, 1953 |
| 2,705,993 | Mann et al. | Apr. 12, 1955 |